United States Patent [19]

Ibanez-Meier et al.

[11] Patent Number: 5,898,362

[45] Date of Patent: Apr. 27, 1999

[54] SYSTEM FOR TRANSMITTING AND RECEIVING POLARIZED CDMA SIGNALS AND METHOD OF OPERATION THEREOF

[75] Inventors: Rodrigo Ibanez-Meier, Chandler; Raymond Joseph Leopold, Tempe; Brian Michael Daniel, Phoenix, all of Ariz.

[73] Assignee: Motorola, Inc., Schaumburg, Ill.

[21] Appl. No.: 08/865,844

[22] Filed: Jun. 2, 1997

[51] Int. Cl.$^6$ .................................................. H04B 7/216
[52] U.S. Cl. ......................................... 370/320; 370/516
[58] Field of Search ............................ 370/208, 209, 370/203, 310, 312, 316, 320, 334, 480, 335, 342, 516; 375/200, 206, 208, 326, 375; 342/361, 371; 455/13.3

[56] References Cited

U.S. PATENT DOCUMENTS

| | | | |
|---|---|---|---|
| 5,276,452 | 1/1994 | Schuss et al. | 342/371 |
| 5,574,721 | 11/1996 | Magill | 370/209 |
| 5,608,722 | 3/1997 | Miller | 370/203 |
| 5,691,974 | 11/1997 | Zehavi et al. | 370/320 |
| 5,694,395 | 12/1997 | Myer et al. | 370/480 |

*Primary Examiner*—Ajit Patel
*Assistant Examiner*—Chiho Andrew Lee
*Attorney, Agent, or Firm*—Dana B. LeMoine

[57] ABSTRACT

A satellite communications system employs CDMA multiple access technology. Polarizations are associated with each spreading code to enhance separation between simultaneous users in the absence of perfectly orthogonal spreading codes. A satellite transmitter CDMA encodes(210) and carrier modulates(220) a user or block of users, and then assigns a polarization to the user or block of users. A CDMA reference signal also receives a polarization. A ground receiver (30,40) receives the polarized CDMA signals as transmitted by the satellite. The ground receiver ascertains the polarization of the reference signal and then computes the polarization of the desired polarized CDMA signal. The use of the reference signal negates the effects of the faraday rotation caused by the satellite signal(10,20) passing through the ionosphere.

19 Claims, 4 Drawing Sheets

SYSTEM FOR TRANSMITTING AND RECEIVING POLARIZED CDMA SIGNALS AND METHOD OF OPERATION THEREOF

FIELD OF THE INVENTION

This invention relates in general to satellite communications, and in particular, to polarized CDMA satellite communications.

BACKGROUND OF THE INVENTION

Satellites employed in satellite communication systems typically must communicate with multiple users simultaneously. Typical methods for multiplexing multiple users are TDMA, FDMA, and CDMA.

CDMA, or Code Division Multiple Access, allows for multiple users through the use of spread spectrum techniques which assign different spreading codes to different users. If all the spreading codes are perfectly orthogonal, then when each user de-spreads his signal using his code, there is no interference contributed by the other users' signals. In practice, pseudo-random spreading codes are used, which are not completely orthogonal. Because of the non-orthogonality of commonly used spreading codes, or otherwise imperfect synchronization with orthogonal codes, multiple users in a satellite communication system employing CDMA necessarily cause interference in each other's communications.

As the number of users communicating with a single satellite increases, the interference increases and the quality of communication drops. The quality of communications and the capacity of the system, as measured by the number of possible simultaneous users, are important performance measures of a satellite based communication system.

Accordingly, there is a great need for a system and method for reducing the interference between users and thus increasing the available capacity of the system and improving the quality of communications.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Generally, the present invention helps mitigate the problem of multiple users causing interference to each others' communications in a CDMA system. In accordance with a first embodiment of the present invention, the apparatus includes a transmitter for transmitting polarized CDMA signals. A polarization network receives a plurality of CDMA signals and an antenna subsystem coupled to the polarization network transmits the polarized CDMA signals.

In accordance with another embodiment of the present invention, the apparatus includes a receiver for receiving polarized CDMA signals. An antenna subsystem receives polarized CDMA signals and a polarization network coupled to the antenna subsystem de-polarizes the polarized CDMA signals.

In accordance with another embodiment of the present invention, the apparatus includes a receiver for receiving a polarized CDMA signal. The receiver includes an antenna subsystem, a polarization network coupled to the antenna subsystem, means for de-spreading the polarized CDMA signal, means for determining an absolute polarization of the polarized CDMA signal, and means for modifying the polarization network in response to the absolute polarization of the polarized CDMA signal.

In accordance with another embodiment of the present invention, a method of operating a transmitter for transmitting polarized CDMA signals is provided. The method includes the steps of CDMA encoding a number of signals to produce a number of CDMA encoded signals, assigning polarization values to each of the number of CDMA encoded signals, and transmitting the CDMA encoded signals at their respective polarizations.

In accordance with another embodiment of the present invention, a method of operating a receiver for receiving a polarized CDMA signal is provided. The method includes the steps of detecting a reference signal as transmitted, measuring the polarization of the reference signal, determining the polarization of the polarized CDMA signal, modifying a polarization network to increase reception of the polarized CDMA signal, and de-spreading the polarized CDMA signal.

Figure 1:
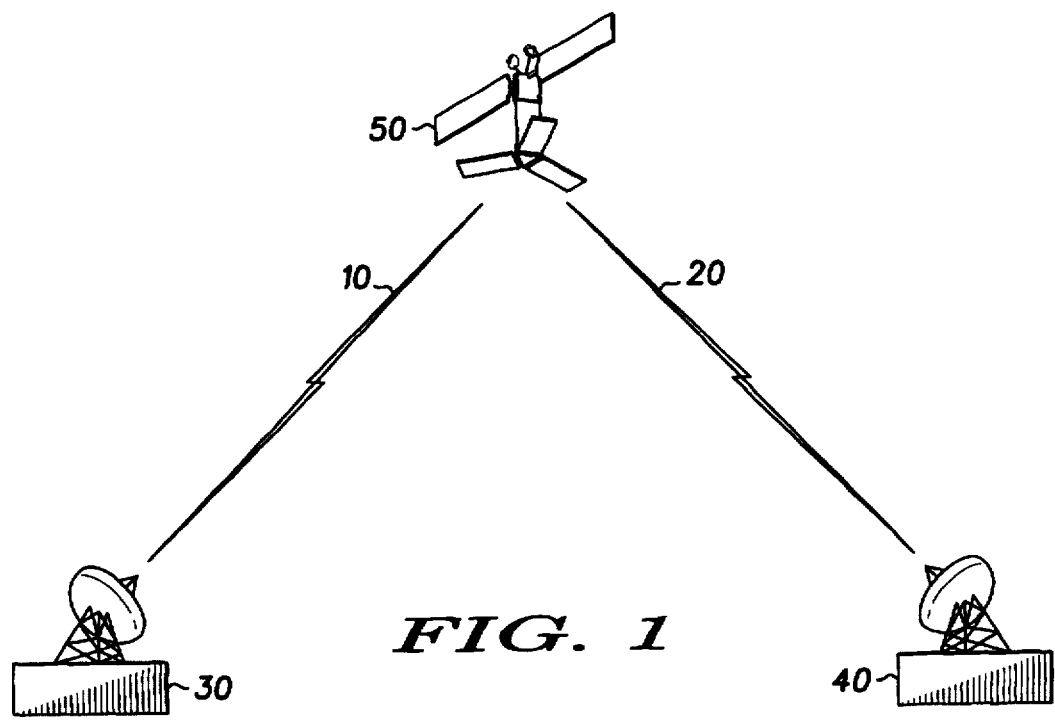
FIG. 1 shows a satellite communication system with multiple users in accordance with an embodiment of the present invention.

FIG. 1 shows a satellite communication system with multiple users in accordance with an embodiment of the present invention. The satellite communication system includes satellite 50 which communicates with ground based users 30 and 40 with signals 10 and 20 respectively. Satellite 50 can be in one of many different types of orbits, preferably a geosynchronous orbit.

Users 30 and 40 represent two users out of a potentially very large number of users. The users in the satellite communication system of the present invention can be mobile, transportable or fixed. They are preferably in a fixed orientation when operating. User 30 communicates with satellite 50 via the signal 10, a CDMA signal which is spread using a code unique to user 30. Likewise, user 40 communicates with satellite 50 via signal 20, a CDMA signal spread using a code unique to user 40. As previously discussed, users 30 and 40 typically employ spreading codes that do not exhibit complete orthogonality and thus interfere with each other.

To mitigate the interference, a preferred embodiment of the present invention employs polarization techniques for signals 10 and 20. As will be discussed in more detail below, the CDMA signal carriers transmitted to users 30, 40, and others now shown, are polarized so that each user will contribute reduced interference to all others.

Linear polarization of signals in free space is a known method for allowing multiple separate communications using a single carrier. For example, a first signal may be vertically polarized using a carrier, and a second signal may be horizontally polarized using the same carrier. As long as the two users have complete orthogonality in their polarizations, they can be separated at a receiver. As the number of users increases beyond two however, perfect orthogonality is no longer possible. Each user added beyond two in a linearly polarized system will interfere with other users, if linear polarization is the only multiple access technique employed.

The method and apparatus of the present invention combines the use of CDMA multiple access technology and polarized carriers to enhance separation between users in the absence of complete orthogonality in spreading codes. The enhanced separation in turn decreases interference for each user as contributed by other users. Decreased interference results in increased quality of communications, and allows the satellite based communication system to increase capacity as measured by the number of simultaneous users.

Of course, the use of polarized CDMA carrier signals is not limited to satellite communication systems, but is widely applicable to a variety of possible communication systems. The method and apparatus and the present invention is therefore not limited to satellite communications. One of the many other possible uses is in the area of terrestrial CDMA networks, and especially networks which have unobstructed line-of-sight (LOS) communications between transmitters and receivers. Terrestrial CDMA networks can benefit greatly from the improved quality of communications and increase in system capacity as provided by the present invention.

SATELLITE TRANSMITTER

Figure 2:
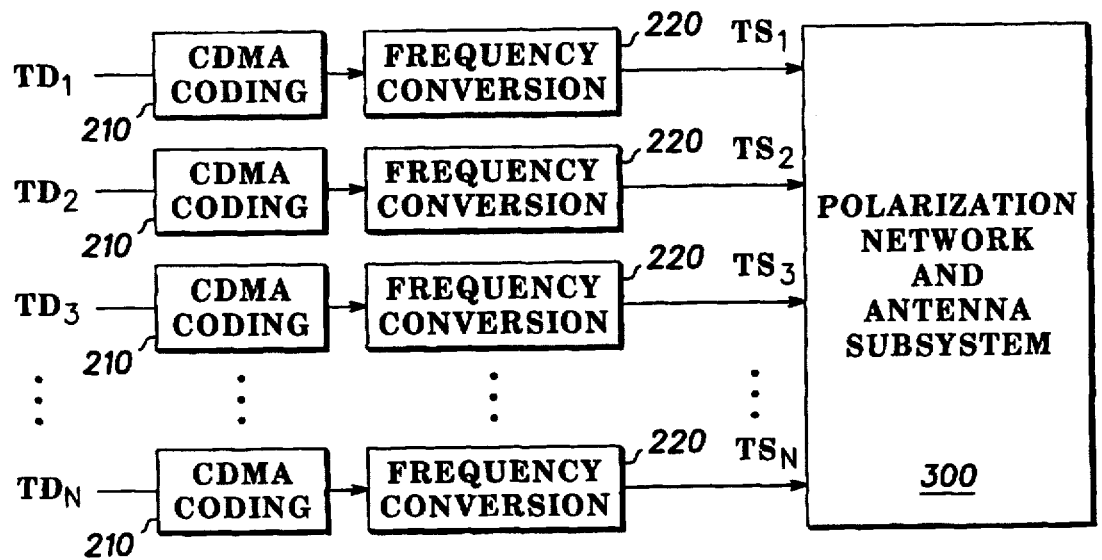
FIG. 2 shows a diagram of a satellite transmitter in accordance with a preferred embodiment of the present invention.

FIG. 2 shows a diagram of a satellite transmitter in accordance with a preferred embodiment of the present invention. FIG. 2 shows multiple transmit data streams designated $TD_1$ through $TD_N$, where N can be any number. The transmit data streams are each encoded with a separate pseudo-random code in CDMA coding blocks 210. After CDMA coding, the signals are up-converted in frequency conversion blocks 220 resulting in transmit signals shown in FIG. 2 as $TS_1$ through $TS_N$. The transmit signals are then input to the polarization network and antenna subsystem 300. As will be discussed in more detail below, polarization network and antenna subsystem 300 transmits the transmit signals at different polarizations.

Each transmit data stream represents the data from a single user, or alternatively, data from multiple users. In the case of a single user, CDMA coding blocks 210 employs a single spreading code to spread the transmit data from the single user. In the case where the transmit data stream represents data from multiple users, CDMA coding block 210 spreads each of the data streams with a separate spreading code. Each frequency conversion block 220 then, has an input, CDMA encoded data stream from one to many users. The output of frequency conversion block 220 can be at one of many possible frequencies, including an IF frequency, but is preferably at the transmit frequency. Each signal denoted by TS then, represents from one to many CDMA encoded data streams up-converted to a carrier frequency. By combining multiple users into a single frequency conversion block, and by polarizing each transmit signal TS differently, multiple users can be assigned to the same polarization value.

Polarization network and antenna subsystem 300 receives each transmit signal, polarized each with a different polarization, combines the polarized waveforms, and transmits the resulting composite CDMA signal. Since each transmit signal has receiver a different polarization value, each user or block of users receiving the resulting composition CDMA signal can take advantage of the polarized transmission to increase the signal quality as received. Increasing the signal quality provides for many advantages, as previously discussed.

Polarization network and antenna subsystem 300 is realizable in a number of possible topologies, but a preferred embodiment is discussed in reference to FIG. 3 below.

Figure 3:
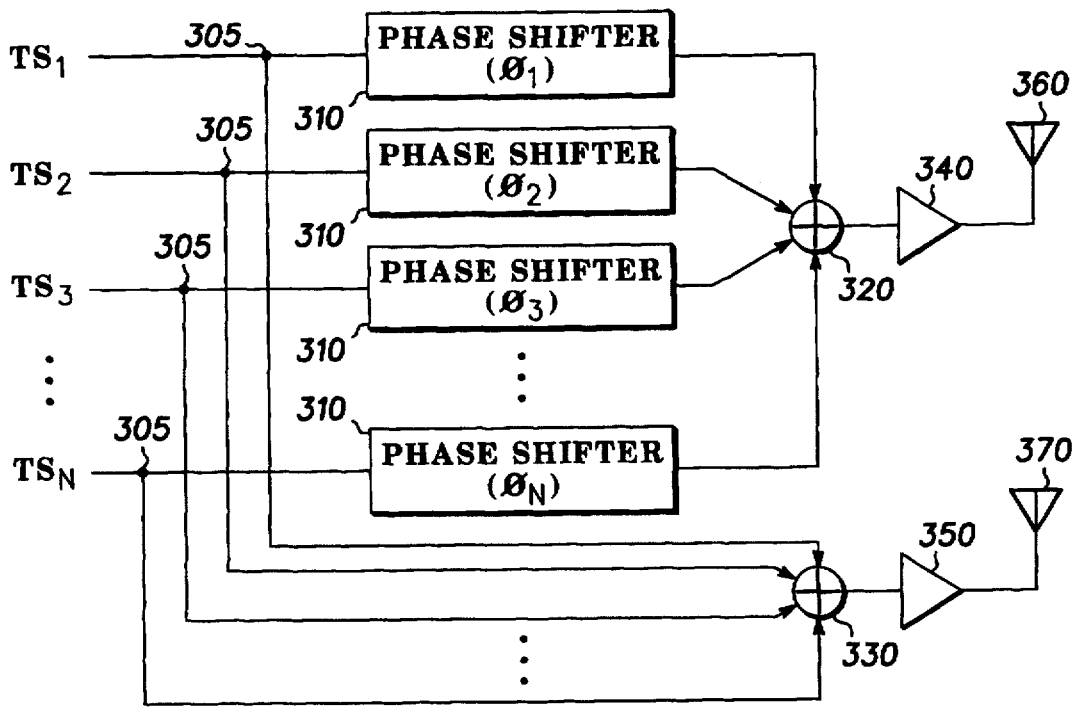
FIG. 3 shows a diagram of a polarization network and antenna subsystem for a satellite transmitter in accordance with a preferred embodiment of the present invention.

FIG. 3 shows a diagram of a polarization network and antenna subsystem for a satellite transmitter in accordance with a preferred embodiment of the present invention. Polarization network and antenna subsystem 300 includes signal splitting devices 305, phase shifters 310, signal summing devices 320 and 330, amplifiers 340 and 350, and antenna elements 360 and 370.

The polarization network and antenna subsystem 300 receives CDMA signals as inputs. The CDMA signals are the transmit signals $TS_1$ through $TS_N$. The CDMA signals are split at signal splitting devices 305, each into two separate but identical components. Signal summing device 330 sums in-phase components of each CDMA signal and provides the resulting waveform to amplifier 350. Amplifier 350 drives antenna element 370 so that the resulting transmit waveform includes in-phase components of each CDMA signal.

Copies of the CDMA signals as output by signal splitting devices 305 are also each fed to a phase shifter 310. Phase shifters 310 have a fixed phase shift, or alternatively, a programmable phase shift. In the preferred embodiment being set forth, the phase shifters have a variable phase shift designated by $\Phi_1$ through $\Phi_N$. The phase shifted CDMA signals as output by phase shifters 310 are summed at signal summing device 320, producing a sum of phase shifted CDMA signals which are then input to amplifier 340. Amplifier 340 drives antenna element 360 which results in a transmitted waveform containing phase shifted CDMA signals.

Antenna elements 360 and 370 are physically oriented such that they have different polarizations. Any orientation which results in antenna elements 360 and 370 having an orthogonal component is contemplated, but antenna elements 360 and 370 are preferably completely orthogonal. In the preferred embodiment, antenna element 360 is vertically polarized and antenna element 370 is horizontally polarized, although they could be differently polarized.

Amplifiers 340 and 350 are shown driving antenna elements 360 and 370 because customarily this is the point where amplifiers reside in such systems. However, it will be readily understood by one skilled in the art that amplifiers can be located throughout the transmitter system.

In operation, phase values $\Phi_1$ through $\Phi_N$ are chosen to maximize the separation between users. If, for example, only two users existed, a first user could be assigned to transmit signals $TS_1$ and $\Phi_1$ could be 0 degrees. The second user could be assigned to transmit signal $TS_2$ and phase value $\Phi_2$ could be 90 degrees. With only two users, polarizations 90 degrees apart maximizes the separation between users. In a like manner, if three users were present in the system, each could be assigned to a separate transmit signal and the corresponding phase values could be 45 degrees apart, thereby enhancing the separation of the three users. As the number of users increases, they are assigned to different transmit signals and the phase values are adjusted to attempt to maximize the polarization differences between two existing users.

This system, which attempts to maximize the polarization difference between users, provides a very robust method of increasing communication quality for each user, and in turn, for increasing the capacity of the system.

In the preferred embodiment, a reference signal which is easily detected by all users in the system is assigned to one of the transmit signals and the phase value used in the corresponding phase shifter 310 becomes a reference phase value. The reference phase value can take on any phase value, but is preferably 0.

Because all of the polarized CDMA waveforms as transmitted by antenna elements 360 and 370 travel from the satellite through the ionosphere and to the ground, they all experience the same faraday rotation, or more simply stated, the same change in polarization. The inclusion of a reference waveform allows all other CDMA signals to have polarization values which are measured relative to the polarization value of the reference signal. Polarization relative to a reference polarization allows the system to operate regardless of the faraday rotation caused by the ionosphere.

The apparatus and methods of the present invention can be advantageously used in a variety of frequency bands, but because the effects of faraday rotation become less pronounced at higher frequencies, the present invention preferably operates at Ka band or above.

SATELLITE RECEIVER

Figure 4:
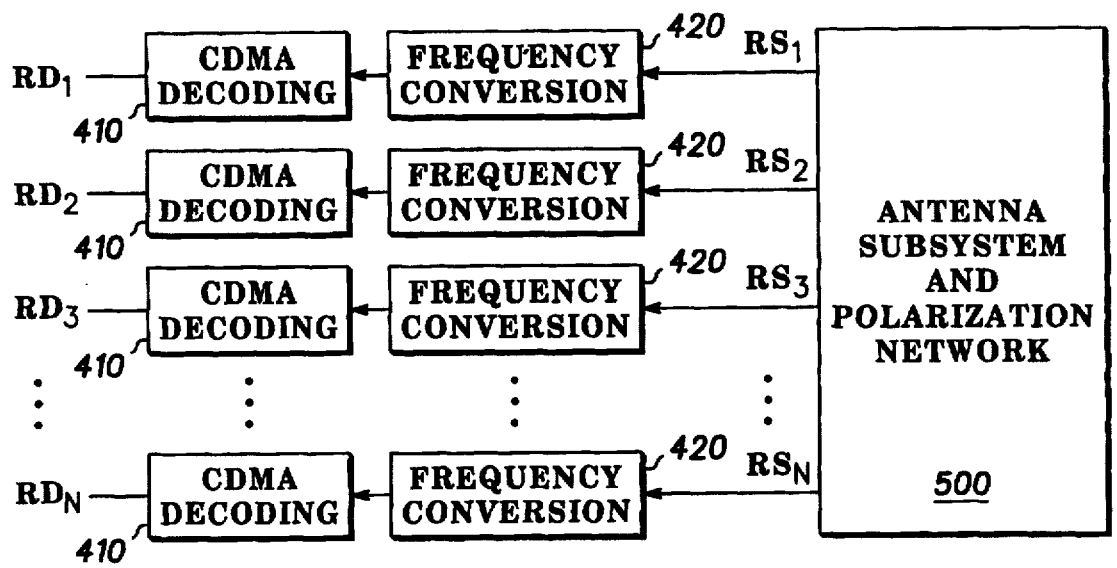
FIG. 4 shows a diagram of a satellite receiver in accordance with a preferred embodiment of the present invention.

FIG. 4 shows a diagram of a satellite receiver in accordance with a preferred embodiment of the present invention. The satellite receiver includes antenna subsystem and polarization network 500, frequency conversion blocks 420, and CDMA decoding blocks 410. The satellite receiver as shown in FIG. 4 is recognizable as very similar to the satellite transmitter of FIG. 2, with the main difference being the direction of the signal flow.

Antenna subsystem and polarization network 500, which will be discussed in more detail below, receives polarized signals, removes the effect of polarization, or de-polarizes the CDMA signals, and produces receives signals labeled $RS_1$ through $RS_n$ in FIG. 4. Each received signal is input to a frequency conversion block 420 which down-converts the signal. The down-converted signal is then input to CDMA decoding block 410.

CDMA decoding block 410 de-spreads the CDMA encoded signals and produces received data streams $RD_1$ through $RD_N$. Each received data stream represents from one to many user data streams. In the case of multiple user data streams, CDMA decoding block 410 de-spreads multiple CDMA encoded streams using multiple pseudo-random codes.

Antenna subsystem and polarization network 500 could be any antenna subsystem and polarization network capable of receiving signals at multiple polarizations and removing the effects of polarization from each signal. A preferred embodiment of antenna subsystem and polarization network 500 is set forth below.

Figure 5:
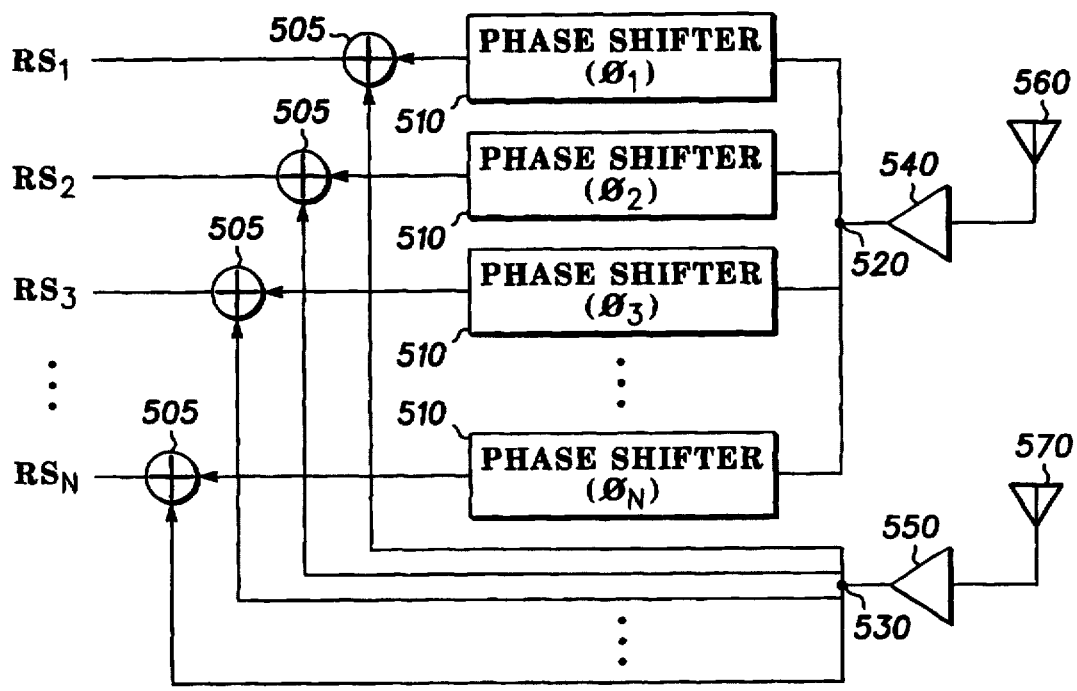
FIG. 5 shows a diagram of an antenna subsystem and polarization network for a satellite receiver in accordance with a preferred embodiment of the present invention.

FIG. 5 shows a diagram of an antenna subsystem and polarization network for a satellite receiver in accordance with a preferred embodiment of the present invention. Antenna subsystem and polarization network 500 includes antenna elements 560 and 570, amplifiers 540 and 550, signal splitting devices 520 and 530, phase shifters 510, and signal summing devices 505. Analogous to the transmit antenna elements shown in FIG. 3, antenna elements 560 and 570 of the satellite receiver have orthogonal components. Antenna element 560 is preferably a vertically polarized antenna and antenna element 570 is preferably a horizontally polarized antenna, although they could be differently polarized. Amplifiers 540 and 550 are shown as low noise amplifiers at the antenna feed points, but one skilled in the art will appreciate that amplifiers may appear throughout the receiver system.

The signal which is output from the amplifier 540 and present at signal splitting device 520 represents the polarized component of the CDMA signals as received by antenna element 560. For example, in the preferred embodiment with antenna element 560 vertically polarized, the signals present at signal splitting device 520 represent the vertically polarized component of each of the polarized CDMA signals as received by antenna element 560. Likewise, the signals present at signal splitting device 530 represent the polarized components of the CDMA signals as received by antenna element 570. In the preferred embodiment, with antenna element 570 being horizontally polarized, the signals present at signal splitting device 530 are the horizontally polarized components of the polarized CDMA signals as received by antenna element 570.

Signal splitting device 520 outputs N copies of the polarized component CDMA signals. Each of these signals is then passed through a phase shifter 510 resulting in N phase shifted polarized component CDMA signals. Each phase shifter 510 can have a fixed phase shift, but preferably has a programmable phase shift designated by $\Phi_1$ through $\Phi_N$.

Signal splitting device 530 produces N copies of the polarized component CDMA signals as received by antenna element 570. Each of these signals is then combined at signal summing devices 505 with the phase shifted polarized component CDMA signals as output by phase shifters 510. The output of signal summing devices 505 are the de-polarized received CDMA signals represented by $RS_1$ through $RS_N$.

Because of the polarization of the signals as received by the antenna elements, the received CDMA signals $RS_1$ through $RS_N$ interfere with each other considerably less than in a non-polarized CDMA system. As previously discussed with reference to the satellite transmitter, this decreased interference results in a number of advantages, including increased capacity and increased quality of communications.

GROUND RECEIVER

Figure 6:
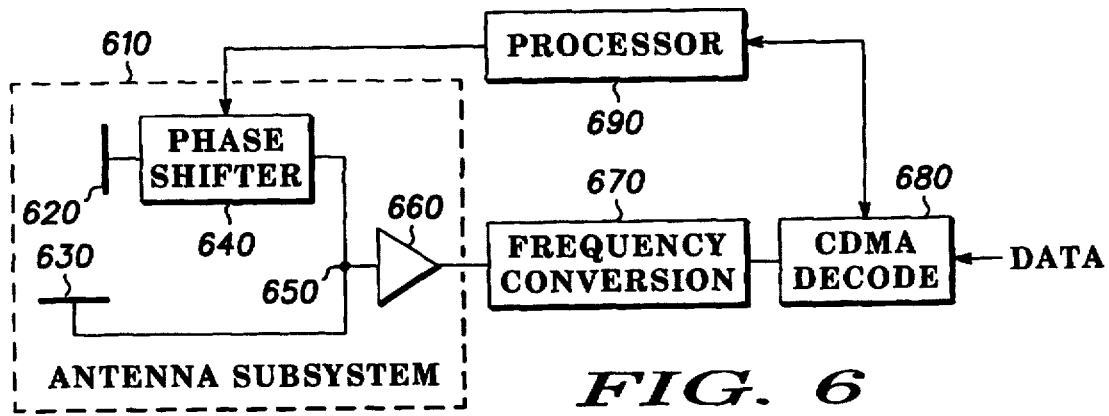
FIG. 6 shows a diagram of a ground receiver in accordance with a preferred embodiment of the present invention.

FIG. 6 shows a diagram of a ground receiver in accordance with a preferred embodiment of the present invention. The ground receiver includes antenna subsystem 610, frequency conversion block 670, CDMA decode block 680, and processor 690. Antenna subsystem 610, in turn, includes antenna elements 620 and 630, phase shifter 640, signal summing device 650 and amplifier 660.

The ground receiver operates very much like the satellite receiver with the exception that in general, a smaller number of polarized CDMA signals is being received. Antenna subsystem 610 receives the polarized CDMA signals as transmitted by the satellite, which are then input to frequency conversion block 670. Frequency conversion block 670 down-converts the signal and CDMA decode block 680 de-spreads the signal to produce a data stream. As in the case of the satellite receiver, the data stream output by CDMA decode block 680 represents data from one to multiple users. In the case of multiple users, CDMA decode block 680 de-spreads each user's data with a different pseudo-random code.

Antenna subsystem 610 could be any antenna subsystem capable of receiving a polarized signal. As shown in FIG. 6, the preferred embodiment of antenna subsystem 610 includes two antenna elements 620 and 630, phase shifter 640, signal summing device 650, and amplifier 660. Antenna elements 620 and 630 have an orthogonal component and in the preferred embodiment being set forth, antenna element 620 is vertically polarized, and antenna element 630 is horizontally polarized, although they could be differently polarized. Antenna element 620 receives the polarized CDMA signals as transmitted by the satellite, and feeds them to phase shifter 640. The phase shifter 640 is controllable by processor 690, so that the ground receiver is capable of receiving signals at any possible polarization. The output of phase shifter 640 is summed at signal summing device 650 with the polarized component CDMA signal as received by antenna element 630. The resulting sum is then amplified by amplifier 660, and then passed on to frequency conversion block 670.

The inclusion of processor 690 allows for the control of phase shifter 640 to increase reception of the desired polarized CDMA signal. Because the polarized CDMA signals have undergone faraday rotation while passing through the ionosphere, the ground receiver may first have to acquire the reference signal, and then modify the phase shifter so that the desired polarized CDMA signal is acquired. Once the desired polarized CDMA signal is acquired, processor 690 can periodically obtain quality measurements as provided by CDMA decode block 680 and incrementally adjust phase shifter 640 to compensate for any changes in polarization. One skilled in the art will appreciate that processor 690 provides a control function which can be implemented in a multitude of fashions, including dedicated digital hardware, or a combined digital and analog control loop.

GROUND TRANSMITTER

Figure 7:
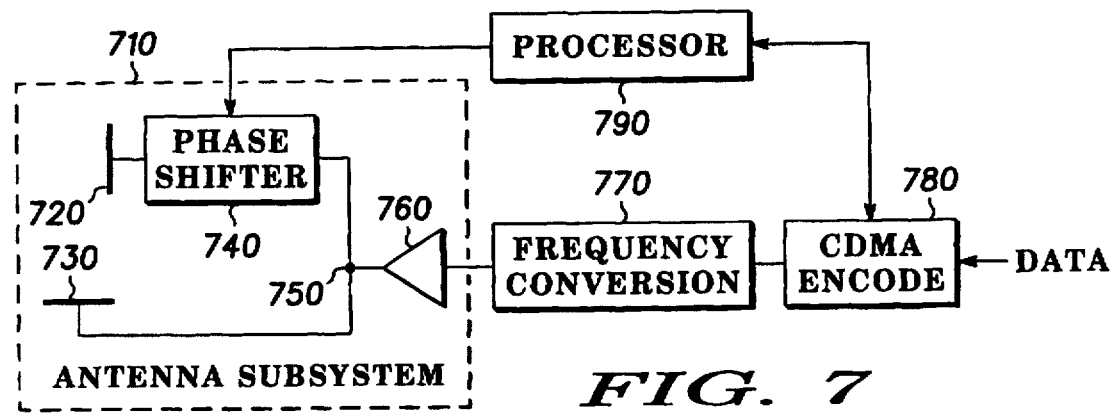
FIG. 7 shows a diagram of a ground transmitter in accordance with a preferred embodiment of the present invention.

FIG. 7 shows a diagram of a ground transmitter in accordance with a preferred embodiment of the present invention. The ground transmitter includes antenna subsystem 710, frequency conversion block 770, CDMA encode block 780, and processor 790. Antenna subsystem 710, in turn, includes antenna elements 720 and 720, phase shifter 740, signal splitting device 750 and amplifier 760.

The ground transmitter operates very much like the satellite transmitter with the exception that in general, a smaller number of polarized CDMA signals is being transmitted. CDMA encode block 780 encodes a data stream which is then input to frequency conversion block 770. As in the case of the satellite transmitter, the data stream input to CDMA encode block 780 represents data from one to multiple users. In the case of multiple users, CDMA encode block 780 spreads each user's data with a different pseudo-random code.

Antenna subsystem 710 could be any antenna subsystem capable of transmitting a polarized signal. As shown in FIG. 7, the preferred embodiment of antenna subsystem 710 includes two antenna elements 720 and 730, phase shifter 740, signal splitting device 750, and amplifier 760. Antenna elements 720 and 730 have an orthogonal component and in the preferred embodiment being set forth, antenna element 720 is vertically polarized, and antenna element 730 is horizontally polarized, although they could be differently polarized.

The inclusion of processor 790 allows for the control of phase shifter 740 to introduce the desired polarization for the transmitted CDMA signal. One skilled in the art will appreciate that processor 790 provides a control function which can be implemented in a multitude of ways, including dedicated digital hardware, or a combined digital and analog control loop.

SYSTEM OPERATION

Figure 8:
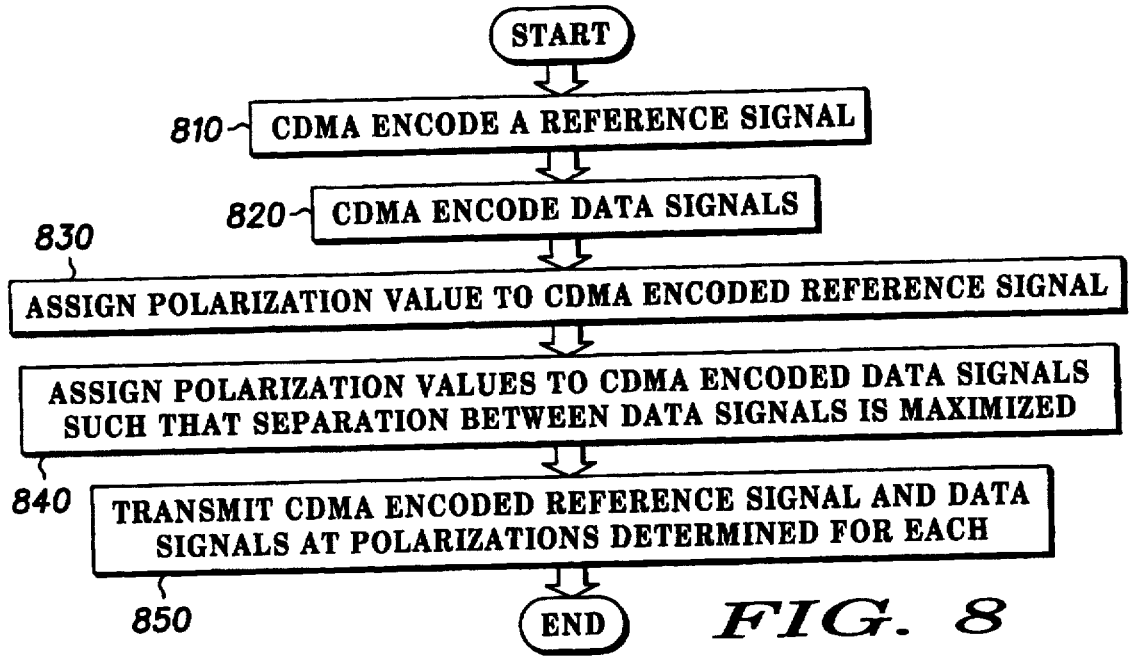
FIG. 8 shows a flow chart for a method of operating a satellite transmitter in accordance with a preferred embodiment of the present invention.

FIG. 8 shows a flow chart for a method of operation a satellite transmitter in accordance with a preferred embodiment of the present invention. In step 810 a reference signal is CDMA encoded. The reference signal receives a unique spreading code known to all users so that it may be easily detected by receivers. After the reference signal is encoded in step 810, data signals are CDMA encoded in step 820. Each data signal receives a unique spreading code in accordance with well known CDMA techniques. In step 830, a polarization value is assigned to the CDMA encoded reference signal. Any polarization value is possible, but in the preferred embodiment a value of 0 is used. After the reference signal is assigned a polarization value in step 830, each of the CDMA encoded data signals is assigned a polarization value in step 840. The polarization values assigned to the CDMA encoded data signals are separated such that the polarization distance between adjacent signals is maximized. After step 840 is complete, the CDMA encoded reference signal and data signals have polarization values assigned. Finally, in step 850, the CDMA encoded reference signal and data signals are transmitted with polarizations that were assigned in steps 830 and 840.

Figure 9:
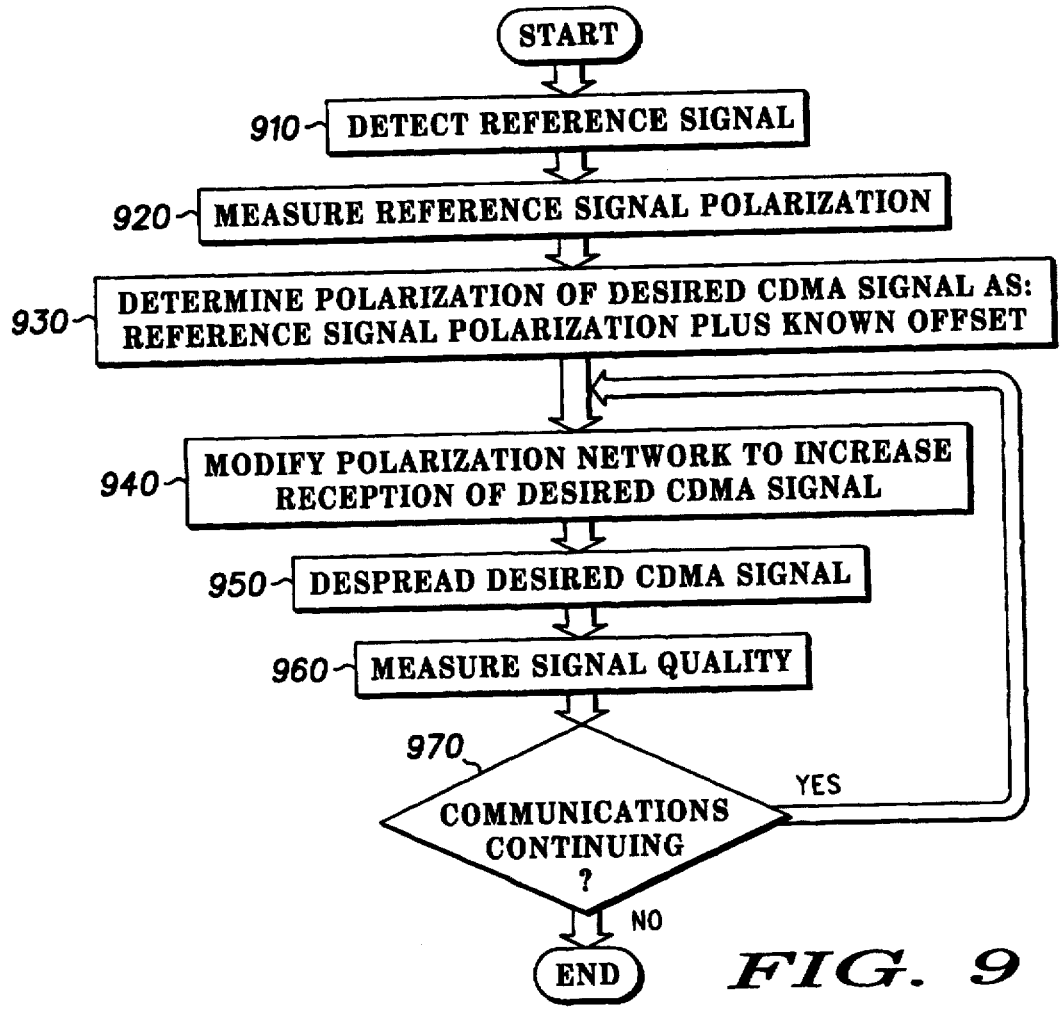
FIG. 9 shows a flow chart for a method of operating a ground receiver in accordance with a preferred embodiment of the present invention.

FIG. 9 shows a flow chart for a method of operating a ground receiver in accordance with a preferred embodiment of the present invention. In step 910, the ground receiver detects the reference signal is transmitted by the satellite. The reference signal is easily detected, because it is assigned a unique and well known spreading code. After the reference signal is detected, the polarization of the reference signal is detected, the polarization of the reference signal is measured in step 920. Once the polarization of the reference signal is known, the polarization of the desired CDMA signal can be found as shown in step 930. The polarization of the desired CDMA signal is found by summing the reference signal polarization with the known polarization offset corresponding to the spreading code of a desired CDMA signal. In step 940 the polarization network is modified to increase reception of the desired CDMA signal, and in step 950, the desired CDMA signal is de-spread.

In step 960, the signal quality of the received signal is measured. The signal quality measurement can be one of many different well known measurements, but it is preferably a code domain power measurement. A decision is made in step in 970 where, if the communications is continuing, the method loops back to step 940 where the polarization network can be modified to increase reception of the desired signal. This updating of the polarization network can occur periodically to continuously compensate for changing faraday rotations caused by the ionosphere.

The methods of FIG. 8 and FIG. 9 depict the operation of the system in a general manner and the steps shown do not necessarily occur in the order shown. For example, in FIG. 8, step 820 can occur before 810, and in FIG. 9, step 970 can occur before step 960.

In summary, a system for employing polarization in combination with CDMA techniques provides for separation between users and decreases interference between users. Decreased interference increases the quality of communications and increases the capacity of the system, both of which are very desirable.

The foregoing description of the specific embodiments will so fully reveal the general nature of the invention that others can, by applying current knowledge, readily modify and/or adapt for various applications such specific embodiments without departing from the generic concept, and therefore such adaptations and modification should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A transmitter comprising:

(1) a polarization network which receives a plurality of CDMA signals and splits each of the plurality of CDMA signals to produce a plurality of non-phase shifted CDMA signals and a plurality of phase shifted CDMA signals, wherein each of the plurality of phase shifted CDMA signals is shifted by a different amount; and (2) an antenna subsystem coupled to said polarization network, said antenna subsystem including:

(a) a first antenna element which transmits the plurality of phase shifted CDMA signals, said first antenna element having a first polarization; and (b) a second antenna element which transmits the plurality of non-phase shifted CDMA signals, said second antenna element having a second polarization which is different from the first polarization;

whereby, subsequent to transmission, the plurality of phase shifted CDMA signals combine with the plurality of non-phase shifted CDMA signals to produce CDMA signals of differing polarizations.

2. The transmitter of claim 1 wherein said polarization network comprises a plurality of programmable phase shifters for producing the plurality of phase shifted CDMA signals.

3. The transmitter of claim 2 wherein said polarization network further comprises:

a first signal summing device for summing said plurality of phase shifted CDMA signals prior to transmission by the first antenna element; and a second signal summing device for summing said plurality of non-phase shifted CDMA signals prior to transmission by the second antenna element.

4. The transmitter of claim 1 wherein said first antenna element has an orthogonal polarization component relative to said second antenna element.

5. A receiver for receiving a plurality of signals having different polarizations, said receiver comprising:

(1) an antenna subsystem for receiving a plurality of polarized CDMA signals, said antenna subsystem comprising:

(a) a first antenna element having a first polarization; and (b) a second antenna element having a second polarization; and (2) a polarization network coupled to said antenna subsystem, which receives first polarized component signals from said first antenna element, receives second polarized component signals from said second antenna element, splits the first polarized component signals into a plurality of first polarized component signals, splits the second polarized component signals into a plurality of second polarized component signals, phase shifts each of the plurality of first polarized component signals by a different phase amount to produce a plurality of phase shifted first polarized component signals, and combines each of the plurality of phase shifted first polarized component signals with a corresponding one of the plurality of second polarized component signals;

thereby de-polarizing the plurality of polarized CDMA signals.

6. The receiver of claim 5 wherein said polarization network comprises:

a plurality of phase shifters for receiving said plurality of first polarized component CDMA signals and producing the plurality of phase shifted first polarized component CDMA signals; and a plurality of summing points for summing each of said plurality of phase shifted first polarized component CDMA signals with a corresponding one of said plurality of second polarized component CDMA signals to produce a plurality of de-polarized CDMA signals.

7. The receiver of claim 6 wherein at least one of said plurality of phase shifters has a programmable phase shift value.

8. The receiver of claim 5 wherein said first antenna element has an orthogonal polarization component relative to said second antenna element.

9. The receiver of claim 7, said receiver further comprising:

means for de-spreading said plurality of polarized CDMA signals;

means for determining an absolute polarization of each of said plurality of polarized CDMA signals; and means for modifying said polarization network in response to said absolute polarization of said plurality of polarized CDMA signals.

10. The receiver of claim 9 wherein each of said plurality of polarized CDMA signals is spread with a different CDMA code, a unique angular offset is associated with each different CDMA code, and said means for determining an absolute polarization comprises:

means for measuring a polarization of a reference signal; and means for summing said polarization of said reference signal with each unique angular offset to produce said absolute polarization of said plurality of polarized CDMA signals.

11. The receiver of claim 9 wherein said de-polarization network comprises a phase shifter and a signal summer.

12. The receiver of claim 9 wherein said first antenna element has an orthogonal polarization component relative to said second antenna element.

13. A satellite communications system that employs polarized CDMA techniques to provide separation between users, said satellite communications system comprising:

a satellite transmitter having a first polarization network and antenna subsystem for transmitting polarized CDMA signals wherein said satellite transmitter CDMA encodes a plurality of signals to produce a plurality of CDMA encoded signals, assigns polarization values to each of said plurality of CDMA encoded signals, and transmits said plurality of CDMA encoded signals at polarizations equal to the polarization values assigned, wherein each of the polarizations assigned to the plurality of CDMA encoded signals is different;

a satellite receiver having a first antenna subsystem and polarization network for de-polarizing a number of received polarized CDMA signals, wherein each of the received polarized CDMA signals is polarized with a different polarization angle;

a ground receiver having a second antenna subsystem and polarization network for de-polarizing a received polarized CDMA signal, wherein the received polarized CDMA signal is one of the polarized CDMA signals transmitted by the satellite transmitter, and wherein said ground receiver detects a reference signal as transmitted by a satellite, measures a reference signal polarization value, determines a polarization of said received polarized CDMA signal, and modifies a polarization network to increase reception of said received polarized CDMA signal; and a ground transmitter having a second polarization network and antenna subsystem for transmitting polarized CDMA signals.

14. A method of operating a transmitter for transmitting a polarized CDMA signal, said method comprising the steps of:

encoding a signal to produce a CDMA encoded signal;

encoding a reference signal to produce a CDMA encoded reference signal;

assigning differing polarization values to each of said CDMA encoded signal and said CDMA encoded reference signal; and transmitting said CDMa encoded signal and said CDMA encoded reference signal at polarizations equal to the polarization values in said assigning step, thereby producing a polarized CDMA signal and a polarized reference signal having a substantially fixed angular relationship.

15. The method of claim 14 where the transmitting step comprises the steps of:

transmitting said CDMA encoded signal and said CDMA encoded reference signal with a first antenna element having a first polarization;

phase shifting said CDMA encoded signal and said CDMA encoded reference signal to produce a phase shifted CDMA encoded signal and a phase shifted CDMA encoded reference signal, wherein the phase shifted CDMA encoded signal and the phase shifted CDMA encoded reference signal are phase shifted by different amounts; and transmitting said phase shifted CDMA encoded signal and said phase shifted CDMA encoded reference signal with a second antenna element having a second polarization;

whereby, subsequent to transmission, the CDMA encoded signal and the CDMA encoded reference signal combine with the phase shifted CDMA encoded signal and the phase shifted CDMA encoded reference signal to produce CDMA signals of differing polarizations.

16. The method of claim 14 wherein said assigning step comprises:

determination polarization values for each of said plurality of CDMA encoded signals which will maximize the separation between each of said plurality of CDMA encoded signals; and assigning phase values to each of said plurality of CDMA encoded signals, wherein said phase values correspond to said plurality of polarization values.

17. A method of operating a receiver for receiving a polarized CDMA signal, said method comprising the steps of:

receiving a polarized reference signal and a polarized CDMA signal, the polarized CDMA signal and the polarized reference signal having a substantially fixed angular relationship;

detecting the polarized reference signal;

measuring a polarization value of the polarized reference signal;

determining a polarization of said polarized CDMA signal;

modifying a polarization network to increase reception of said polarized CDMA signal; and de-spreading said polarized CDMA signal.

18. The method of claim 17 wherein said determining step comprises:

summing the reference signal polarization value with a known polarization offset corresponding to said polarized CDMA signal.

19. The method of claim 17 further comprising the steps of:

measuring a signal quality of said polarized CDMA signal; and responsive to said signal quality, repeating said modifying step.

* * * * *

UNITED STATES PATENT AND TRADEMARK OFFICE
CERTIFICATE OF CORRECTION

PATENT NO. : 5,898,362
DATED : April 27, 1999
INVENTOR(S) : Rodrigo Ibanez-Meier, Raymond Joseph Leopold, and Brian Micheal Daniel et al.

It is certified that error appears in the above-identified patent and that said Letters Patent is hereby corrected as shown below:

Claim 9, Column 10,
Line 35, delete "7" and replace with -- 5 --.

Claim 14, Column 11,
Line 35, delete "CDMa" and replace with -- CDMA --.

Signed and Sealed this

Twenty-eighth Day of August, 2001

Attest:

NICHOLAS P. GODICI
*Attesting Officer*   *Acting Director of the United States Patent and Trademark Office*